INVENTOR:
ROBERT L. HARRIS
BY
ATTORNEY,

United States Patent Office 3,428,842
Patented Feb. 18, 1969

3,428,842
BASE-MOUNTED MOTOR
Robert L. Harris, Ferguson, Mo., assignor to Emerson Electric Co., St. Louis, Mo., a corporation of Missouri
Filed Jan. 5, 1967, Ser. No. 607,410
U.S. Cl. 310—217    5 Claims
Int. Cl. H02k 5/22

ABSTRACT OF THE DISCLOSURE

In a base-mounted motor with a stator bolted to a base with through-bolts, a laminated electrically insulating washer interposed between the stator and the head of each through-bolt. The washer has a metal sheet contiguous the through-bolt head, a tongue projecting between successive axially projecting ends of slot wedges, and a hole defined by fingers extending into a through-bolt hole in the stator to locate the washer, center the through-bolt, and hold the through-bolt shank away from the stator at the head end.

The steps of adhering the metal sheet and an insulating sheet. coating the exposed surface of the insulating sheet with a heat curable adhesive, forming the washer described, bonding the washer to the upper radial face of the stator and thereafter inserting and tightening the through-bolt.

CROSS REFERENCE TO RELATED APPLICATION

The subject matter of this application is related to the subject matter of an application of Robert M. Vreeland, Ser. No. 556,140, filed June 8, 1966, owned by a common assignee.

BACKGROUND OF THE INVENTION

This invention relates to base-mounted motors in which a wound stator with a core made up of a stack of laminations, is bolted in face-to-face relation to a base made of an electrically conductive material, by means of through-bolts which extend entirely through the stack of laminations and into the base. The invention has particular application to hermetic motors, and is described particularly as applied to hermetic motors, but its usefulness is not confined to hermetic motors.

Refrigerator compressors with hermetic motors of this sort have been made for many years in large volume. The rotor of such motors is generally shipped separately from the stator and the stator and rotor are assembled, to form the completed motor, by the compressor manufacturer. The manufacturer bolts the stator to a cast metal base with a flat or flats of the base in face-to-face contact with the outer radial face of the lowermost lamination of the stator core. Through-bolts, extending through axially aligned holes in the laminations, are threaded into tapped holes in the base, and the underside of each bolt head is pulled down tightly against the upper radial face of the uppermost lamination. The bolts must be drawn down tightly to hold the stator in place, because the stator cannot be permitted to move relative to the base (hence the rotor) after the unit is sealed.

This arrangement has worked to the satisfaction of the compressor manufacturers in general because, heretofore, it was not recognized that such an arrangement would lower the motor efficiency, since no electrical problem peculiar to this arrangement was known to exist. It was considered by those who considered the matter, that the bolts formed part of a magnetic circuit of the core iron. The discovery of a problem and a general solution to it are discussed in the application of Robert M. Vreeland, to which reference has been made above, in which it is pointed out that contrary to what has been thought, an electric current is induced in the bolts, and passes through the bolts, the base, and the lamination with which the bolt heads come in contact, to form an electrical circuit which produces a power loss in the energized winding.

One of the objects of this invention is to provide an electric motor assembly of the type in which a wound stator with a core made up of a stack of laminations is bolted in face-to-face relation to a base made of an electrically conductive material, which assembly has less current and power input than such motors known heretofore, to achieve the same performance.

Another object of this invention is to provide such an assembly which is simple to manufacture, economical and effective.

Still another object is to provide a method of producing such an assembly.

Other objects will become apparent to those skilled in the art in the light of the following description and accompanying drawing.

SUMMARY OF THE INVENTION

In accordance with this invention, generally stated, in a base-mounted motor wherein a stator is bolted to a base by means of a through-bolt having a shank and a head, the shank extending through a hole in the stator in an axial direction and the head bearing mediately upon a radial face of the stator, a substantially planar washer is provided, positioned between the head of the through-bolt and the radial face of the stator. The washer is laminated of a plurality of layers adhered together, with a thin metal layer facing the head of the through-bolt and an electrically insulating layer between the thin metal layer and the stator face. In hermetic motor manufacture, the washer is preferably adhered to the stator face before the through-bolt is inserted. The washer has a tongue integral with the washer and adapted to project between successive slot insulators lining the slots of the stator and projecting axially beyond the stator face. The washer has a through-bolt shank-receiving hole in it defined by a spacer member projecting from the plane of the washer in a direction away from the head of the through-bolt, the spacer member being interposed between the through-bolt shank and the wall defining the bolt-receiving hole in the stator. Preferably, the spacer member takes the form of circumferentially spaced fingers. Also preferably, the washer is turnip shaped, and the through-bolt receiving hole is positioned closer to the outside edge than it is to the tongue ("root") edge of the body of the washer.

A method of assembling the stator assembly is also provided, which includes laminating a thin sheet of electrically insulating material to a thin sheet of metal by means of an adhesive which in a hermetic application is unaffected by a refrigerant in the hermetic environment, coating the exposed surface of the insulating material with a partially curable adhesive and partially curing the adhesive to a dry condition; thereafter punching a hole in the laminated sheet to form a multiplicity of radially inwardly extending fingers; thereafter bending the fingers out of the plane of the sheet in the direction of the insulating material with respect to the thin metal sheet; thereafter positioning a washer-sized part of the laminated, punched, coated sheet on a radial face of a stator, with the fingers projecting into a through-bolt shank-receiving hole, with the coated insulating sheet against the stator face, bonding the washer to the stator by completing the curing of the adhesive by heating the stator and washer, and thereafter inserting a through-bolt through the hole and tightening the through-bolt.

DESCRIPTION OF THE PREFERRED EMBODIMENT

Figure 1:
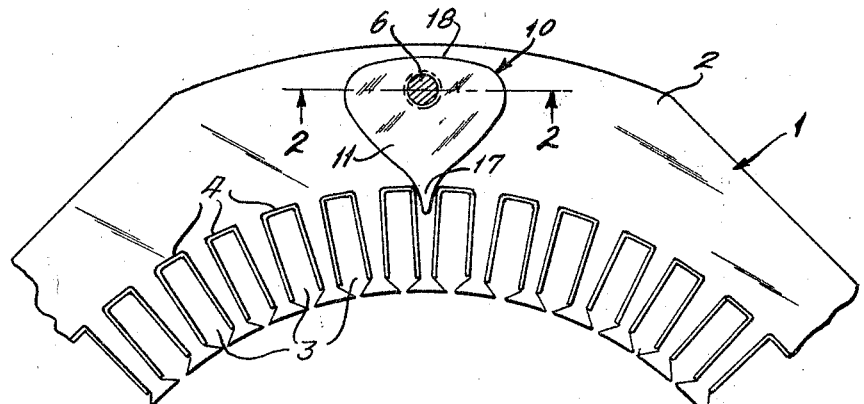
FIGURE 1 is a fragmentary top plan view, partly in section, of a stator of a hermetic motor, the stator windings being omitted for clarity, showing a washer in place and a through-bolt shank extending through it.

Referring now to the drawing for one illustrative embodiment of stator assembly of this invention, reference numeral 1 indicates a laminated stator with an upper radial face 2, slots 3 which contain windings, not here shown, and slot insulators 4, which project axially a short distance above the radial face 2. A through-bolt receiving hole 5 extends axially through the stator. The stator 1 has a lower radial face which rests on one or a plurality of flats on a base, not here shown. The base has threaded holes in it adapted to receive a threaded lower end of a through-bolt 6. The through-bolt 6 has a head 7, with a substantially flat undersurface 8.

A washer 10 is bonded to the face 2. The washer 10, in this embodiment is turnip shaped in plan, with a tongue or root 17 and an outer edge 18, opposite the tongue 17. A through-bolt receiving hole 15, nearer to the outer edge 18 than to the tongue 17 is defined by spacer fingers 16 which project out of the plane of the body of the washer 10.

The washer 10 is made up of a hardened steel sheet 11 and an insulating sheet 13 bonded to the steel sheet by means of adhesive 12. The washer is bonded by adhesive 14 between the insulating sheet 13 and the stator face 2.

In making the stator assembly of this invention, the stator is assembled and wound in the usual way, and may be dipped in varnish preparatory to baking. The washer is made by laminating a thin sheet of electrically insulating material such, for example, as a high temperature polyamide sheet insulation to a sheet of hardened steel by means of an adhesive such, for example, as an epoxy resin which is unaffected by refrigerant in the hermetic environment. A coating of adhesive, also of a type unaffected by the refrigerant, is then applied to the exposed face of the insulating material and dried, partially curing the adhesive. Thereafter, the stock is punched to form a multiplicity of radially inwardly extending fingers. The fingers are then bent out of the plane of the sheet in the direction of the insulating material with respect to the steel, and the washer is punched from the stock. It can be appreciated that these punching and forming operations can be carried out in various ways as with a multistage die or successive operations. Thereafter the washer is positioned on the stator face, with the fingers 16 projecting into the hole 5 in the stator, and the tongue 17 projecting between successive wedge ends, as shown in FIGURE 1. The areas of the stator face on which the washers are to be put can either be substantially cleared of varnish or the varnish can be compatible with the adhesive, e.g. epoxy varnish, epoxy adhesive. The washers, of which there are ordinarily four, are preferably held tight against the stator face by means of a clamp, and the stator is baked, curing the adhesive and bonding the washer to the face of the stator.

Figure 2:
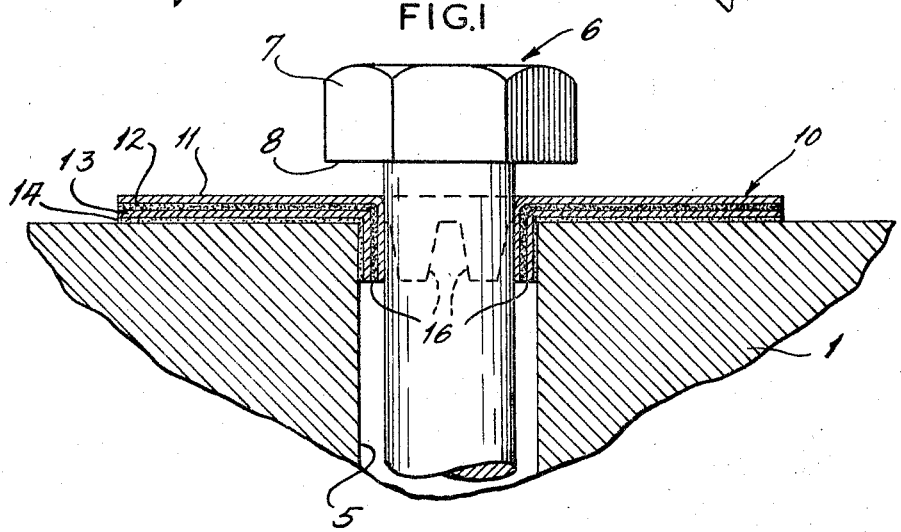
FIGURE 2 is a sectional view taken along the line 2—2 of FIGURE 1, showing the through-bolt in untightened condition.
Figure 3:
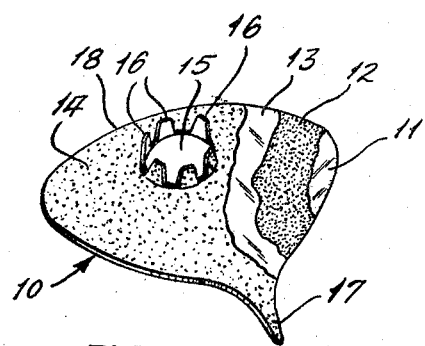
FIGURE 3 is a view in perspective, partly broken away, of the washer shown in FIGURES 1 and 2 before assembly on the stator.

The stator is then usually shipped to a compressor manufacturer, who puts the through-bolts in place, and runs them down tight against the metal facing 11 of the washer. As can be seen from FIGURE 2, the fingers 16 serve not only to locate the washer, in cooperation with the tongue 17 which also orients the washer, but also serves as spacers to center the through-bolt 6 and keep it out of contact with the through-bolt-hole defining wall of the stator at the head end.

Merely by way of illustration and not of limitation, the steel sheet 11 can be .005 of an inch thick, the sheet of insulating material .002. The insulation sheet may be of the type sold by the Du Pont Company under the trademark Nomex, and can be adhered to the steel by means of an epoxy adhesive sold by Minnesota Mining & Manufacturing Co. under the designation EC1386. The adhesive used to bond the washer to the stator face may be an epoxy adhesive sold by Leepoxy Company under the designation E1. The adhesive between the metal sheet 11 and insulating sheet 13 can be applied in so-called 100% solids form, while the adhesive applied to the exposed face of the insulating sheet in generally a low solids slurry or solution.

The turnip shape of the washer provides more bearing surface than can be obtained by the use of a round washer, because it is undesirable for the washer to overhang the radially outer edge of the stator.

Numerous variations in the construction of the stator assembly of this invention, within the scope of the appended claims, will occur to those skilled in the art in the light of the foregoing disclosure. For example, a somewhat different shaped washer may be used, as long as the washer is oriented in place and provides sufficient bearing surface for the through-bolt head. Additional lamina may be used. These are merely illustrative.

Having thus described the invention, what is claimed and desired to be secured by Letters Patent is:

1. In a base-mounted motor wherein a stator is bolted to a base by means of a through-bolt having a shank and a head, the shank extending through a hole in the stator in an axial direction and the head bearing mediately upon a radial face of the stator, the improvement comprising a substantially planar washer positioned between the head of the through-bolt and the radial face of the stator, said washer being laminated of a plurality of sheets adhered together, with a thin metal sheet facing the head of the through-bolt and an electrically insulating sheet between the thin metal layer and the said stator face, said washer having a through-bolt shank-receiving hole in it defined by a spacer member projecting from the plane of the washer in a direction away from the head of the through bolt, said spacer member being interposed between the through-bolt shank and the wall defining the bolt-receiving hole in the stator.

2. The improvement of claim 1 wherein the washer is adhered to the stator face.

3. The improvement of claim 1 wherein the washer has a tongue integral with the washer and adapted to project between successive slot insulators seated in slots of the stator and projecting beyond the said stator face.

4. The improvement of claim 1 wherein the spacer member takes the form of circumferentially spaced fingers.

5. The improvement of claim 3 wherein the washer body is turnip shaped and the through-bolt receiving hole is closer to the outside edge of the body than it is to the tongue.

References Cited

UNITED STATES PATENTS

| | | | |
|---|---|---|---|
| 2,406,045 | 8/1946 | Stevens | 336—210 X |
| 2,458,112 | 1/1949 | Steinmayer | 336—210 X |
| 2,561,679 | 7/1951 | Waller | 85—50 X |
| 2,615,068 | 10/1952 | Radice | 310—259 X |
| 2,884,100 | 4/1959 | McKee | 85—50 X |

FOREIGN PATENTS 46,217   4/1936   France.

MILTON O. HIRSHFIELD, *Primary Examiner.*

E. SUTTON, *Assistant Examiner.*

U.S. Cl. X.R.

29—596; 85—50; 310—259